United States Patent Office 2,742,914
Patented Apr. 24, 1956

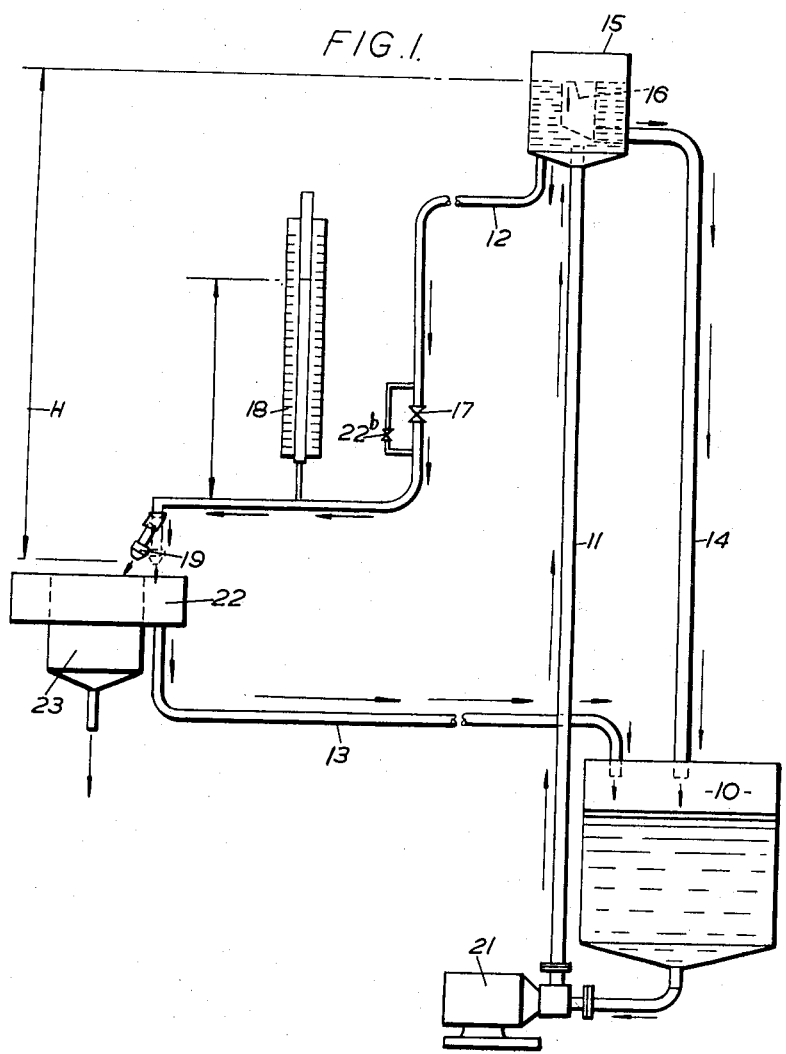

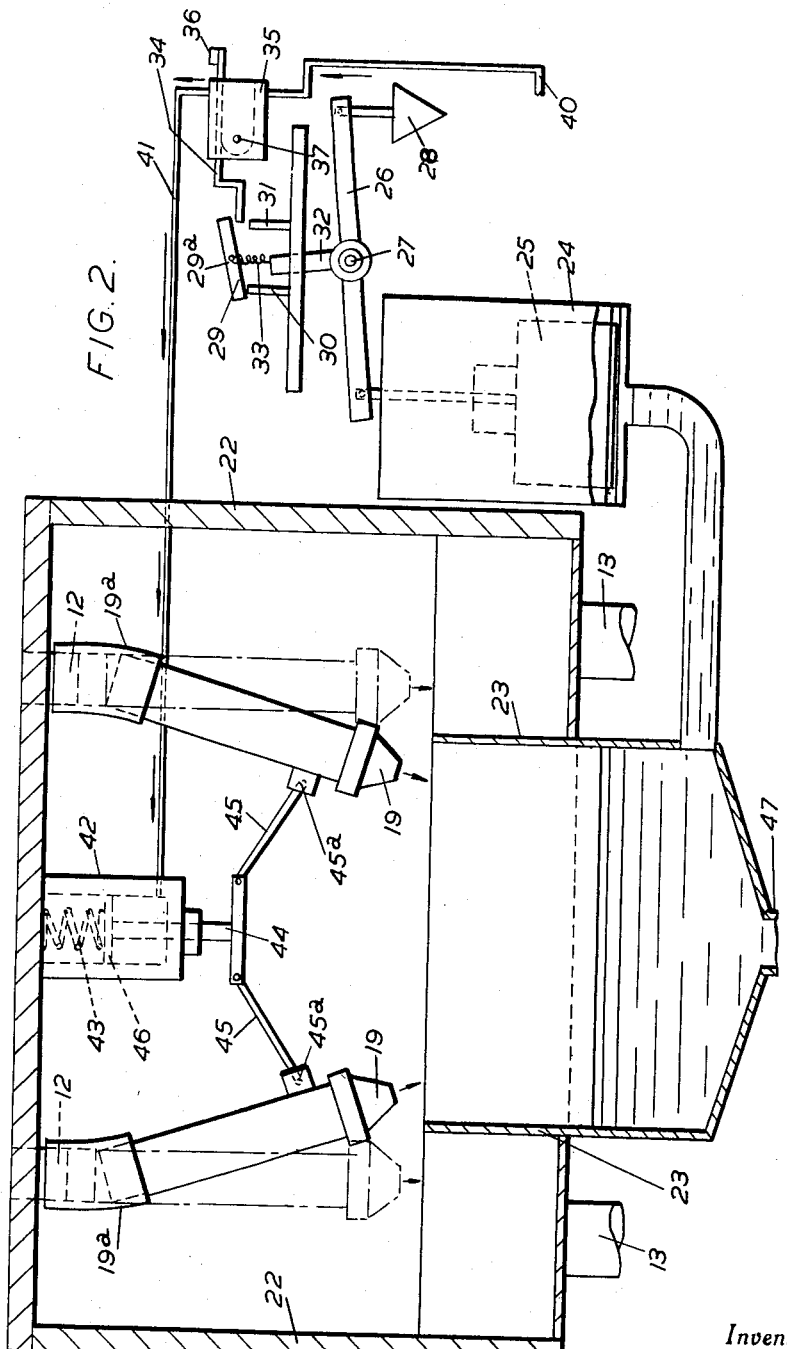

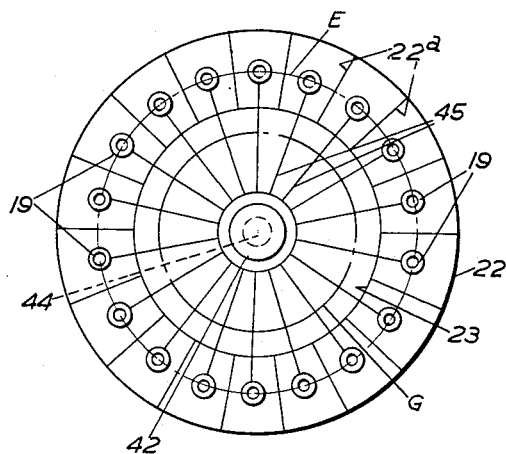
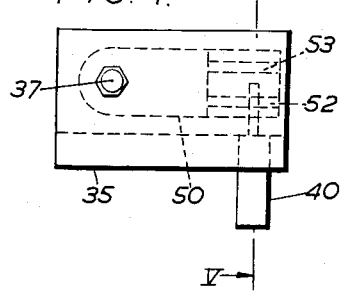
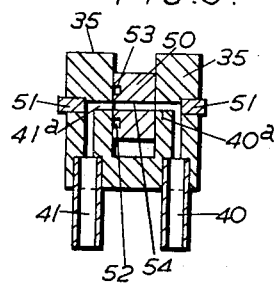

2,742,914

METHOD OF AND APPARATUS FOR CONTINUOUSLY MAINTAINING UNIFORM THE COMPOSITION OF A COMPOSITE LIQUID

Robert Stewart Erskine Hannay, Edinburgh, Scotland, and William Kilby, Lancaster, England, assignors to Standfast Dyers & Printers Limited, Lancaster, England Application August 6, 1951, Serial No. 240,562

Claims priority, application Great Britain August 15, 1950

12 Claims. (Cl. 137—1)

This invention relates to a method of and apparatus for continuously maintaining uniform the composition of a composite liquid resulting from a mixture of component liquids. The invention is particularly applicable to a continuous supply of dyes or other treating liquids for the continuous processing of textiles, but may be applied to other purposes, for example, blending of oils.

At present the usual method of supplying dyes or the like is to measure out the component dye-stuffs or auxiliary products manually and to supply them as a batch to a common dye vessel which contains the resulting composite dye liquor. This is not only a process taking a substantial time but is subject to the errors of the operative. Further, in a continuously running process it is necessary to attempt to calculate the total amount needed for the amount of cloth or other material to be processed and it is the normal practice to be on the safe side, thus in most cases involving a substantial waste of dye liquor or other processing liquid.

Moreover, when, for example, the dyeing of a length of cloth is to be initiated, it is necessary to make up the required batch and to do a trial run and thus ascertain by trial and error the exact proportions of the components necessary to give the required final result.

The chief object of the present invention is to enable a supply of dyeing or other composite liquid to be maintained of uniform composition continuously for as long as necessary until completion of the entire dyeing or other operation utilising this particular composition. A further object is to enable a particular composition of liquid to be accurately repeated in further dyeing or other operations and to reduce trial and error therefor to the minimum.

In accordance with the present invention, we provide apparatus for continuously maintaining uniform the composition of a composite liquid resulting from mixture of component liquids and which is being consumed; comprising a plurality of component supply tanks one for each component liquid, for each component supply tank a liquid circulating circuit leading away from and back again to such tank, means for maintaining a steady flow of the component liquid in each circulating circuit, and diversion means in each circulating circuit adapted to divert the flow therefrom intermittently to a delivery point instead of return to the corresponding component supply tank.

More specifically, we provide apparatus for continuously maintaining, and maintaining uniform, a supply of a composite liquid resulting from mixture of component liquids; comprising a plurality of component supply tanks one for each component liquid, a common mixing vessel for supplying the resulting composite liquid, for each component supply tank a liquid circulating circuit leading away from and back again to such tank, means for maintaining a steady flow of the component liquid in each of said circulating circuits, diversion means in each circulating circuit for diverting the flow therefrom to said common mixing vessel, means for selecting the diversion means of predetermined circulating circuits in accordance with the component liquids required for a particular mixture, and means for operating said selected diversion means in accordance with change in level of the resulting composite liquid in the mixing vessel.

We will now describe some embodiments of the invention simply by way of example, with reference to the accompanying drawings in which:

Fig. 1 is a diagrammatic view showing the association of the main parts of the apparatus.

Fig. 2 is an enlarged view showing an example of mechanism for automatically and intermittently diverting the component flows and utilising air pressure and an air control valve.

Fig. 3 is a diagrammatic plan view to a reduced scale illustrating the means for operating selected diversion means in synchronism.

Fig. 4 is an elevation, and

Fig. 5 a section on line V—V of Fig. 4, of an air control valve.

Referring to Fig. 1, a series of supply tanks 10 is provided, one for each component liquid, and each is connected to a circulating circuit 11, 12, 13 which leads away from the supply tank through a constant head tank 15, a flow control valve 17, a diversion nozzle 19 and back to the supply tank, circulation of the component liquid being effected by a centrifugal pump 21. The flow when diverted at 19 feeds a mixing tank 23 in which the diverted flow from all the selected circulating circuits is mixed in order to provide the resultant liquid, for example a dye liquor.

The constant head tank 15 is partially covered or sealed to minimise evaporation and includes a cylindrical weir 16, a constant head being maintained owing to the fact that excess liquid delivered by pump 21 through a perforated anti-turbulence discharge pipe into tank 15 passes over the weir and is by-passed through conduit 14 back to the supply tank, and liquid is thus delivered through conduit 12 at constant head H (Fig. 1). The arrows indicate the directions of circulation.

The flow control valve 17 may be of the straight-through type and is adjustable. A rate of flow meter 18 includes an indicating column of liquid which is supported by the pressure in the pipe line set up by the nozzle 19 below the column, and the column indicates a measure of the quantative rate of flow in pipe line 12 at any moment.

A series of interchangeable calibrated nozzles 19, each of different size is provided for each pipe line 12, each size of nozzle when used in conjunction with a constant head delivery being usable for a given range of rates of flow. The control valve 17 is used to give fine adjustment of the rate of flow within that range, and if a different range is required a different size of nozzle can be quickly fitted instead. A chart is provided for each nozzle size which gives the reading on the scale 18 corresponding to a particular rate of flow through pipe line 12.

Thus when the desired rate of flow is known, the nozzle size is fitted, and then after consulting the chart, the control valve is adjusted to give the reading on the scale 18 corresponding to the exact flow required.

The small diameter by-pass and its control valve at 22b are provided for occasional use when it is desired to provide a minute rate of flow when correspondingly small bore nozzles 19 are in use.

Referring to Fig. 2, the diversion nozzles 19 may be moved between the positions shown in the full and in chain-dotted lines in order either to direct the flow into the common mixing tank 23 or to return it through the circulating circuit, that is, conduit 13, to the supply tank.

A float chamber 24 is connected with tank 23 and contains a float 25 actuating a float lever 26 having a pivot 27 and a balance weight 28. Movement of lever 26 oscillates the spigot 32 fixed thereto and through a spring 33 tilts control plate 29 about its pivot 29a in either direction between stops 30 and 31. When moved in one direction corresponding to sinking of float 25, the plate 29 presses down air valve lever 34 against its control weight 36 thereby moving air valve 35 to the "through" position and allowing compressed air to pass from the supply line 40 through the valve to the pipe line 41 which pipe line communicates with the underside of a piston 46 and urges the piston upwardly against the spring 43 housed within the cylinder 42, the piston thus through its piston-rod 44 and link 45 pivoting the nozzle 19 towards the position shown in full lines in Fig. 2, in which it delivers its flow to the mixing tank 23.

On the float 25 thereafter rising to the required height it tilts lever 26 in the other direction thereby tilting plate 29 in the direction to allow air valve lever 34 to rise and to allow air below the piston 46 to exhaust through the air valve to atmosphere, whereupon the spring 43 causes nozzle 19 to move into the position shown in chain-dotted lines in which it directs the flow back into the circulating circuit as aforesaid.

Referring to Fig. 3, a series of nozzles 19 is arranged on a pitch circle E when in non-diverted position, and on a pitch circle G when in the diverted position. The nozzles are arranged concentrically about the axis of piston rod 44 each nozzle being connected thereto by a link 45 which can be easily disconnected at 45a. The nozzles thus move radially outwards or inwards as the piston 46 falls or rises, the flexible tubular coupling 19a permitting this movement.

The selected nozzles are thus rendered operative by connection at 45a, the others being rendered inoperative by disconnection there. When operative the nozzles feed the common mixing tank defined by annular wall 23, and when inoperative each returns the flow through its individual receptacle bounded by radial walls 22a and annular walls 22, 23, such receptacles leading to the respective return conduits 13.

Referring now to Figs. 4 and 5, the air valve comprises two stationary body parts 35 between which a slide 50 is vertically pivotal about 37. Compressed inlet 40 and outlet 41 lead to horizontal transverse passages 40a and 41a, while slide 50 has a similar transverse passage 54 and lower and upper longitudinal passages 52, 53 whose remote ends (at the right hand side in Fig. 4) open to atmosphere. Thus in the Fig. 5 or intermediate position the air inlet and outlet are interconnected and the air pressure applied to the underside of piston 46 (Fig. 2), while in either upper or lower position the air inlet is cut off and the cylinder 42 exhausts to atmosphere through passage 41a and passage 52 or 53. End plugs 51 close the ends of passages 40a, 41a, after the initial drilling thereof during manufacture.

Air valve lever 34 (Fig. 2) operates slide 50, and in practice the lever is set so that one of passages 52, 53 is utilised for exhausting, in the present instance passage 52.

In operation, with the various supply tanks containing their respective component liquids, for preparation of a particular dye liquor or other mixture, one first determines the flow required through each pipe 12, and then fits the requisite size of nozzle on each of the selected circulating circuits and connects them to piston rod 44. The exact flow from each nozzle is then arranged by adjusting control valves 17 with reference to the charts and to meter 18. The apparatus can then be started and nozzles 19 are operated synchronously and automatically by operation of the float 25 in accordance with the delivery requirements. In this way the necessary amount of the mixture is maintained in mixing tank 23 and a continuous supply to the dye vessel or other machine is maintained through outlet 47.

If it is desired to supply a mixed liquid of different composition this may be done by merely selecting and connecting nozzles of different circulating circuits to piston rod 44.

Alternatively or in addition to changing the nozzles 19, flow control valves 17 of selected circuits may be adjusted so as to vary the proportion of the respective component liquids relative to each other.

In a modification the diversion nozzles may be in continuous operation, the amount of diversion being adjusted as required.

Means may be provided for operating the nozzles by hand instead of or in addition to the automatic operation. This may be done directly or through a manual valve short-circuitting automatic valve 35.

In a modification, instead of using the constant head tank arrangement together with the nozzles and flow control valves, the pump 21 or other power delivery means in each circulating circuit may be adjustable in its delivery capacity so that a predetermined delivery may be accurately regulated.

In a further modification, each constant head tank may have connections to a plurality of circulating circuits, and these circulating circuits may supply different mixing vessels 23.

We claim:

1. Apparatus for continuously maintaining uniform the composition of a composite liquid composed of a plurality of component liquids while said composite liquid is being consumed, comprising a common mixing chamber, a plurality of supply tanks, one for each liquid component, a liquid circulating circuit leading away from and back again to each of said supply tanks, means to entirely and instantaneously divert the flow of liquid in each circulating circuit from its respective circulating circuit to the said common mixing chamber, means for maintaining steady flow of each component liquid to the diverting means in each circulating circuit, and means for synchronously diverting the flow of liquid in each circulating circuit in accordance with change in level of the resulting composite liquid in said mixing chamber.

2. Apparatus as recited in claim 1 in which said diverting means is actuated by fluid under pressure and in which a float positioned upon the said composite liquid actuates a valve which controls the supply of fluid under pressure.

3. Apparatus as recited in claim 1 in which a piston and cylinder device in operative connection with said diverting means is employed to divert said flow of liquid.

4. Apparatus as recited in claim 3 in which at least three circulating circuits are employed and wherein the operative connections between the piston and cylinder device and the diverting means are detachable to enable selection of the circulating circuits in accordance with the number of component liquids required for the production of a particular composite liquid.

5. Apparatus as recited in claim 1 in which the diverting means includes a nozzle to enable the flow of liquid to the diverting means to be predetermined.

6. Apparatus as recited in claim 5 in which the means for maintaining a steady predetermined flow of each component liquid to the diverting means in each circulating circuit includes a valve mounted upon the conduit which leads to the nozzle.

7. Apparatus as recited in claim 6 in which a pressure indicating device is operably connected to the conduit which leads to the nozzle between the nozzle and the valve.

8. Apparatus as recited in claim 1 in which the steady flow to the diverting means in each circulating circuit is maintained by means of a constant-head tank forming a part of said circulating circuit, said constant-head tank delivering liquid through a conduit to the diverting means.

9. A method of continuously maintaining uniform the composition of a composite dye liquor composed of a plurality of different component liquids while said composite liquor is being consumed which comprises continuously circulating a flow of each component liquid in an independent circulating circuit so that there is a flow in the circuit at a constantly maintained rate and intermittently abruptly but synchronously entirely diverting the said flows from the said independent circuits to a common mixing location.

10. A method as recited in claim 9 in which the relative strengths of the component liquids in the mixture is varied by varying the rate of flow of at least one of the component liquids in its circulating circuit.

11. A method as recited in claim 9 in which at least three different flows are employed to produce the resulting composition of the mixture of component liquids.

12. A method as recited in claim 9 in which the rate of flow of each component liquid in its circulating circuit is measured and adjusted to a predetermined value before the said liquid flows in the said independent circuit are diverted to said common mixing location.

References Cited in the file of this patent

UNITED STATES PATENTS

| | | |
|---|---|---|
| 1,082,287 | Schaffer et al. | Dec. 23, 1913 |
| 1,140,742 | Hannemann | May 25, 1915 |
| 1,820,210 | Barker | Aug. 25, 1931 |
| 2,057,027 | Hoover | Oct. 13, 1936 |
| 2,389,412 | Carlton | Nov. 20, 1945 |
| 2,389,413 | Carlton | Nov. 20, 1945 |
| 2,424,163 | Hammer | July 15, 1947 |
| 2,582,802 | Terrell, Jr. | Jan. 15, 1952 |